US012011411B2

(12) United States Patent
Scott

(10) Patent No.: US 12,011,411 B2
(45) Date of Patent: Jun. 18, 2024

(54) WALKING ROLLER ASSEMBLY

(71) Applicant: Timothy J. Scott, Clarion, PA (US)

(72) Inventor: Timothy J. Scott, Clarion, PA (US)

( * ) Notice: Subject to any disclaimer, the term of this patent is extended or adjusted under 35 U.S.C. 154(b) by 213 days.

(21) Appl. No.: 17/824,400

(22) Filed: May 25, 2022

(65) Prior Publication Data

US 2023/0381051 A1 Nov. 30, 2023

(51) Int. Cl.
*A61H 3/00* (2006.01)
*A61H 3/02* (2006.01)

(52) U.S. Cl.
CPC ................ *A61H 3/00* (2013.01); *A61H 3/02* (2013.01); *A61H 2003/005* (2013.01); *A61H 2003/007* (2013.01); *A61H 2003/0211* (2013.01); *A61H 2201/1253* (2013.01); *A61H 2201/1269* (2013.01); *A61H 2201/164* (2013.01); *A61H 2201/1671* (2013.01); *A61H 2201/1676* (2013.01); *A61H 2203/0406* (2013.01); *A61H 2205/106* (2013.01)

(58) Field of Classification Search
CPC .... A61H 2003/0211; A61H 3/02; A61H 3/00; A61H 2003/005; A61H 2003/007; A61H 2201/1253; A61H 2201/1269; A61H 2201/164; A61H 2201/1671; A61H 2201/1676; A61H 2203/0406; A61H 2205/106
USPC .......................................................... 135/84
See application file for complete search history.

(56) References Cited

U.S. PATENT DOCUMENTS 1,934,346 A * 11/1933 Fisher .................. A61F 5/0585 602/10
2,762,367 A * 9/1956 Rubin .................. A61F 13/045 602/11
3,986,502 A * 10/1976 Gilson .................... A61H 3/00 135/84
5,300,016 A 4/1994 Marlatt
D362,506 S * 9/1995 Bieri ............................ D24/190
6,056,673 A * 5/2000 Arrecis .................... A61H 3/00 482/66
6,494,919 B1 * 12/2002 Matthews ............... A61H 3/02 623/32
7,303,537 B1 * 12/2007 Snyder ...................... A61F 3/00 135/74
7,588,043 B1 9/2009 Bais
(Continued)

FOREIGN PATENT DOCUMENTS

WO WO-2012070507 A1 * 5/2012 .............. A61H 3/02

*Primary Examiner* — Robert Canfield

(57) ABSTRACT

A walking roller assembly includes a leg sling for receiving a patient's lower leg and pair of roller frames each attached to the leg sling. Each of the roller frames has a curved member which engages a support surface upon which the patient is walking. Thus, each of the roller frames inhibits the patient's lower leg from supporting the patient's body weight to facilitate a leg injury to heal. The curved member of each of the roller frames curves downwardly with respect to the leg sling thereby facilitating the leg sling to rock when the patient walks thereby simulating the patient's normal gait. A leg panel is pivotally attached to the pair of roller frames and the leg panel is oriented at an angle with the leg sling. In this way the leg panel can receive the patient's upper leg and orient the patient's leg in a bent position.

13 Claims, 7 Drawing Sheets

(56) References Cited

U.S. PATENT DOCUMENTS

| | | | | |
|---|---|---|---|---|
| 8,672,865 | B2 * | 3/2014 | Franke | A61F 5/0195 600/595 |
| 8,778,031 | B1 * | 7/2014 | Latour, Jr. | A61F 5/0102 135/65 |
| 9,375,377 | B1 * | 6/2016 | Edwards | A61H 3/00 |
| 9,408,443 | B2 * | 8/2016 | Hunter | A61H 3/0288 |
| 9,839,568 | B2 * | 12/2017 | Butler | A61H 3/02 |
| 2009/0165834 | A1 * | 7/2009 | West | A61H 3/02 135/65 |
| 2011/0240076 | A1 * | 10/2011 | Hateley | A61H 3/0244 135/66 |
| 2017/0231853 | A1 * | 8/2017 | Auger | A61H 3/00 623/40 |
| 2018/0110671 | A1 * | 4/2018 | Adams | A61H 3/0277 |
| 2022/0125663 | A1 * | 4/2022 | Greenhalgh | A61H 3/0288 |

* cited by examiner

WALKING ROLLER ASSEMBLY

CROSS-REFERENCE TO RELATED APPLICATIONS

Not Applicable

Statement Regarding Federally Sponsored Research or Development

Not Applicable

The Names of the Parties to a Joint Research Agreement

Not Applicable

Incorporation-by-Reference of Material Submitted on A Compact Disc or as a Text File Via the Office Electronic Filing System Not Applicable

Statement Regarding Prior Disclosures by the Inventor or Joint Inventor

Not Applicable

BACKGROUND OF THE INVENTION

(1) Field of the Invention

The disclosure relates to walking devices and more particularly pertains to a new walking device for assisting a person with an injured leg to walk normally. The device includes a leg sling for receiving a patient's lower leg and a leg panel for engaging the patient's upper leg. The device includes a pair of roller frames that are each attached to the leg sling. The roller frames roll along a support surface while the patient is walking thereby inhibiting the patient's lower leg from supporting weight.

(2) Description of Related Art Including Information Disclosed Under 37 CFR 1.97 and 1.98

The prior art relates to walking devices including a knee brace device that includes a crutch pivotally attached to the knee brace for walking assistance. The prior art discloses a walker that includes a sling upon which a patient's leg can be positioned with employing the walker. The prior art discloses a leg brace device that includes a curved member with extends beneath a patient's foot such that the curved member supports the weight of the patient when the patient is walking. The prior art discloses a leg brace device that includes an upper brace that engages a patient's upper leg, a lower brace that is pivotally coupled to the upper brace and which engaging the patient's upper leg, and a crutch extending downwardly from the lower brace for engaging a support surface. The prior art discloses a knee crutch device that includes a block upon which a patient's knee can be positioned and a handle attached to the block to facilitate the patient to hold the block in place for walking.

BRIEF SUMMARY OF THE INVENTION

An embodiment of the disclosure meets the needs presented above by generally comprising a leg sling for receiving a patient's lower leg and pair of roller frames each attached to the leg sling. Each of the roller frames has a curved member which engages a support surface upon which the patient is walking. Thus, each of the roller frames inhibits the patient's lower leg from supporting the patient's body weight to facilitate a leg injury to heal. The curved member of each of the roller frames curves downwardly with respect to the leg sling thereby facilitating the leg sling to rock when the patient walks thereby simulating the patient's normal gait. A leg panel is pivotally attached to the pair of roller frames and the leg panel is oriented at an angle with the leg sling. In this way the leg panel can receive the patient's upper leg and orient the patient's leg in a bent position.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
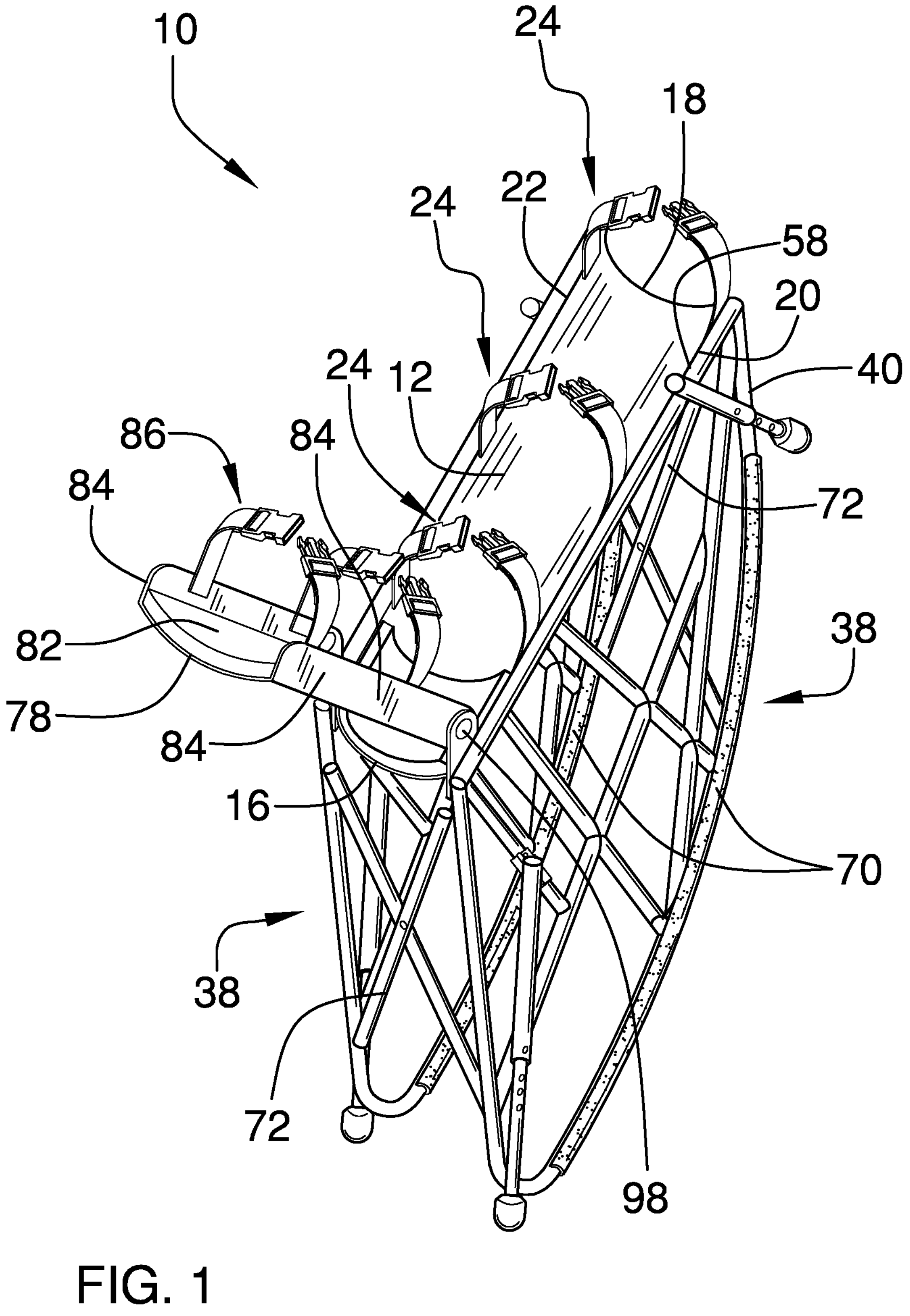
FIG. 1 is a top perspective view of a walking roller assembly according to an embodiment of the disclosure.
Figure 2:
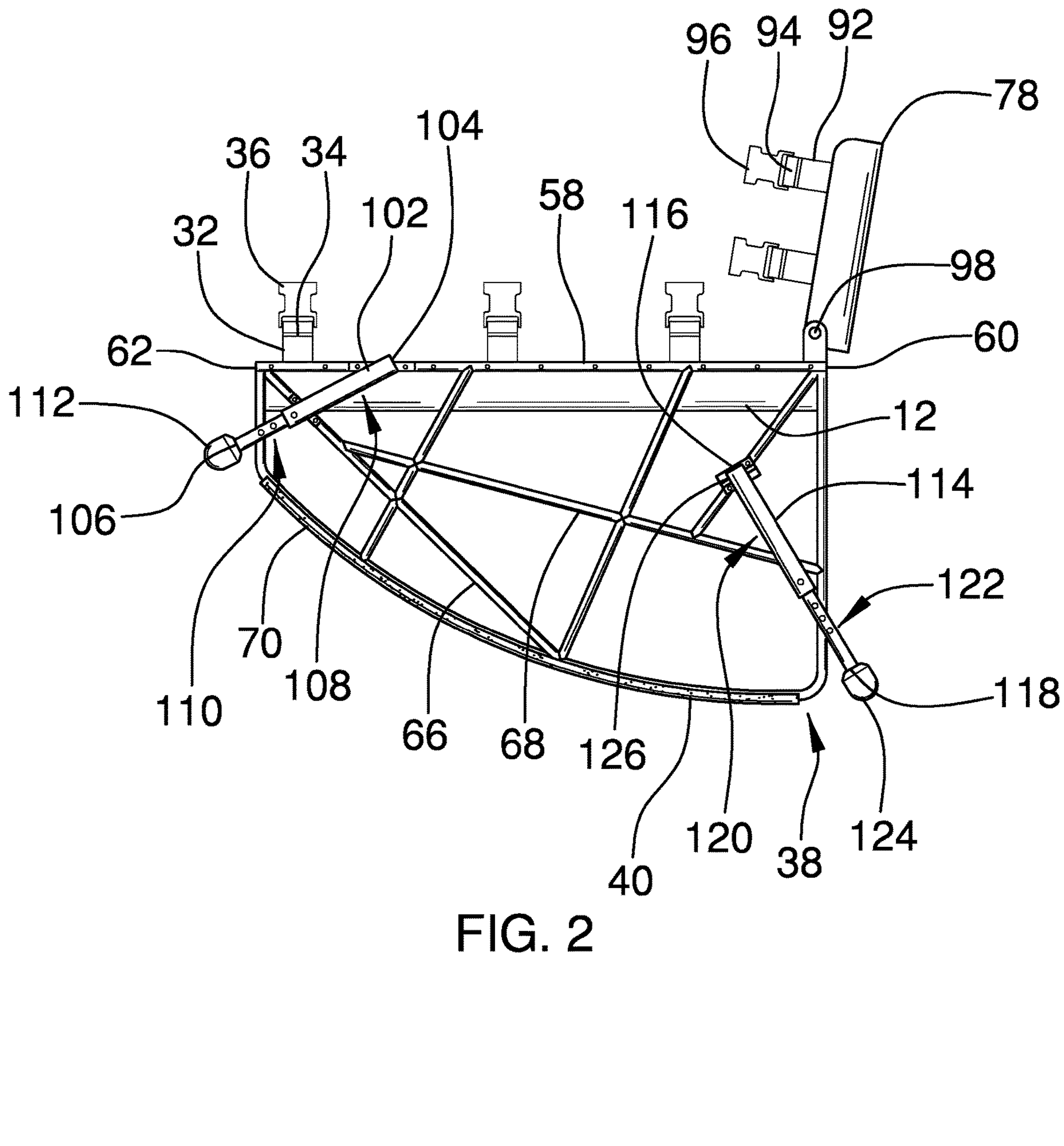
FIG. 2 is a right side view of an embodiment of the disclosure.
Figure 3:
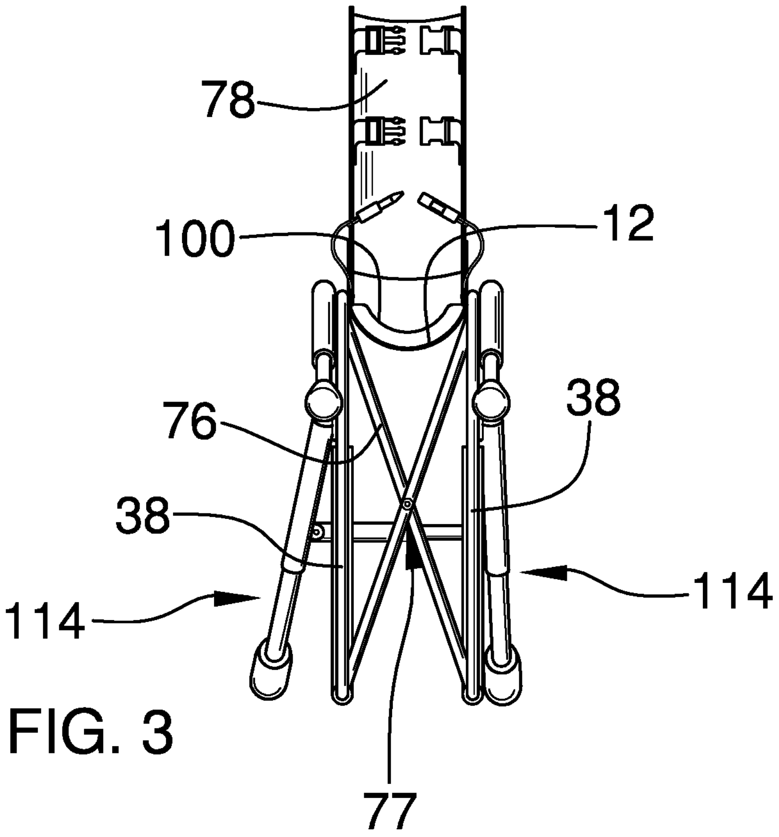
FIG. 3 is a back view of an embodiment of the disclosure.
Figure 4:
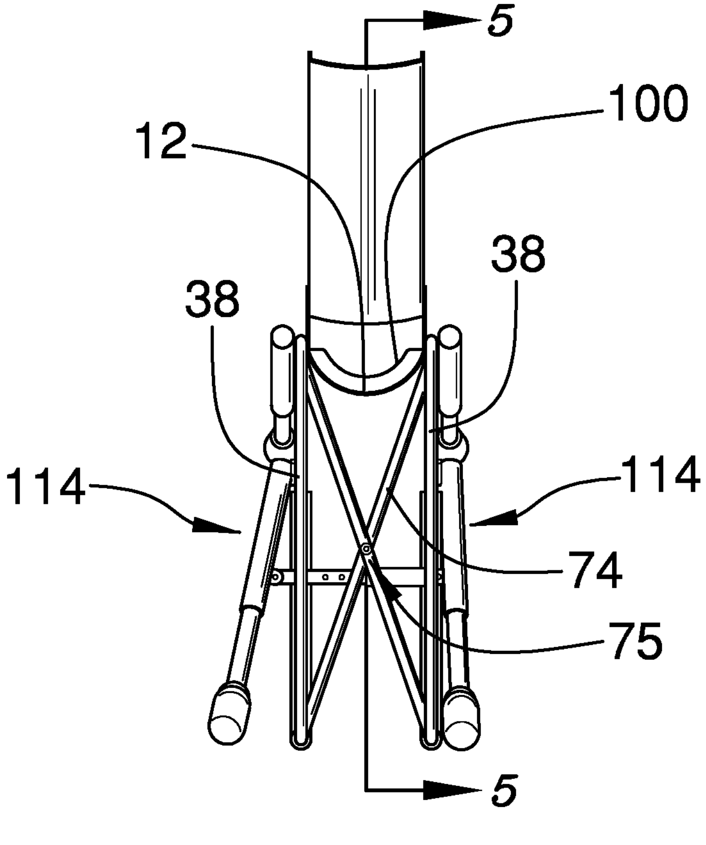
FIG. 4 is a front view of an embodiment of the disclosure.
Figure 5:
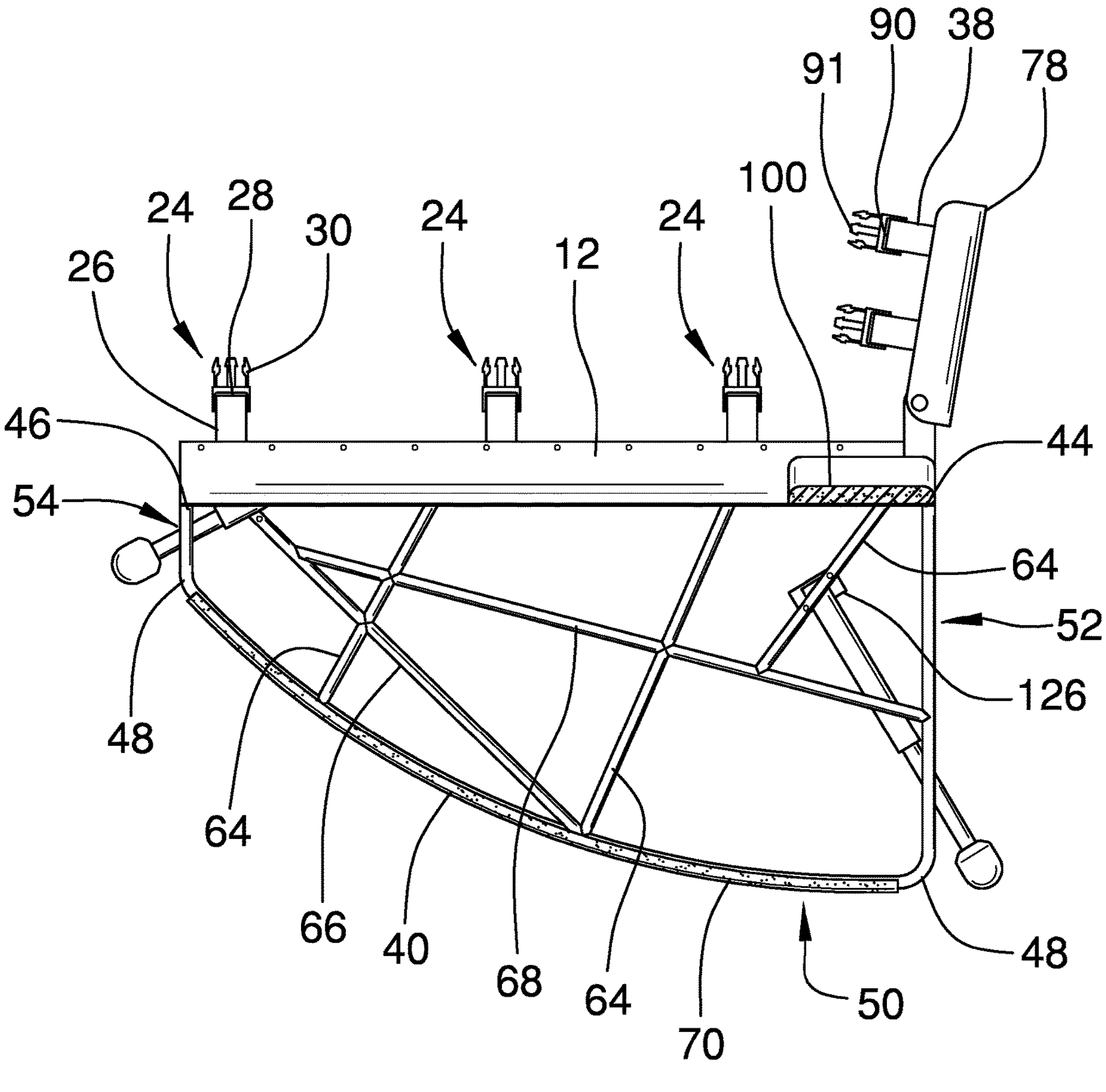
FIG. 5 is a cross sectional view taken along line 5-5 of FIG. 4 of an embodiment of the disclosure.
Figure 6:
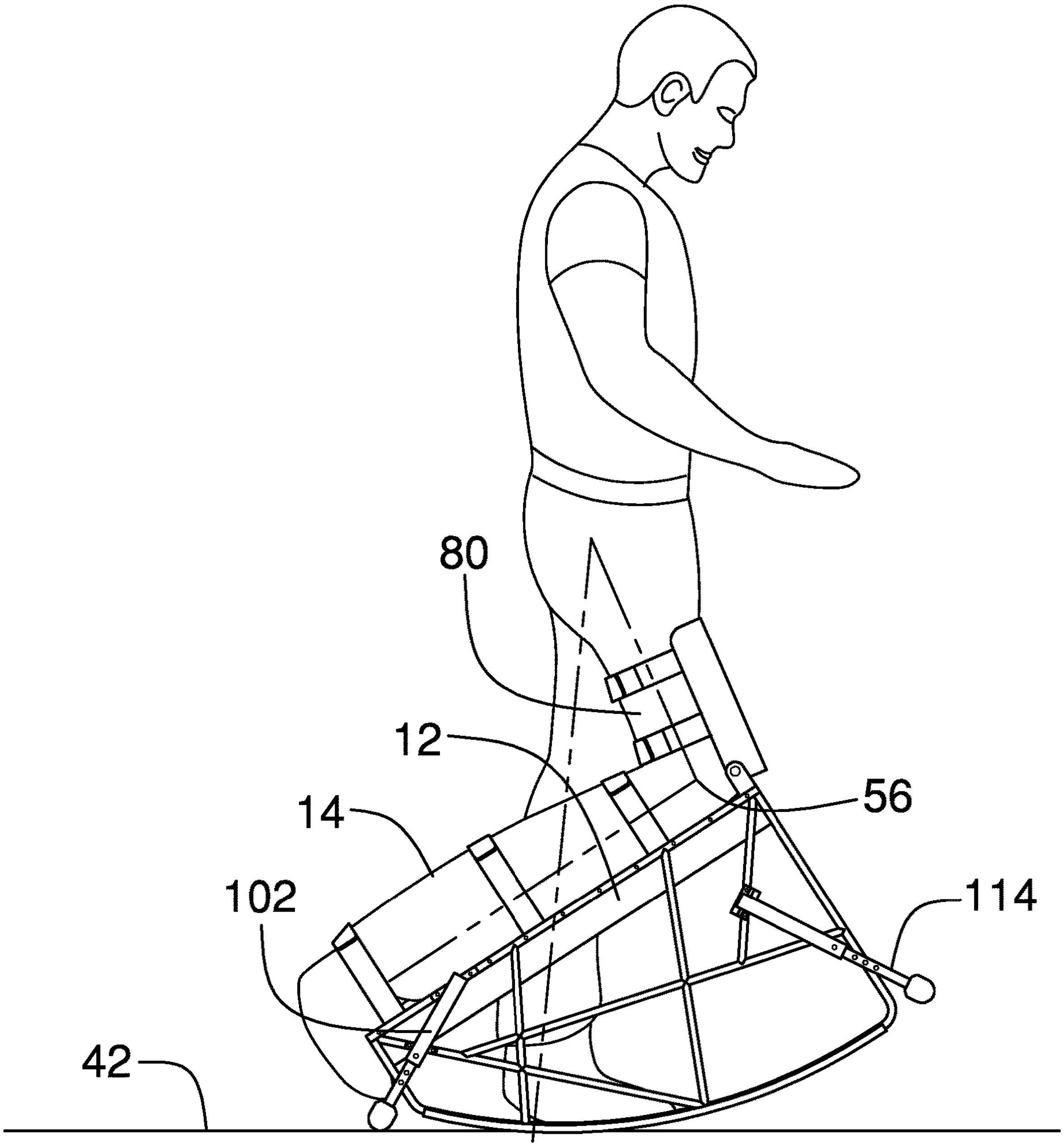
FIG. 6 is a perspective in-use view of an embodiment of the disclosure showing a patient beginning to take a step.
Figure 7:
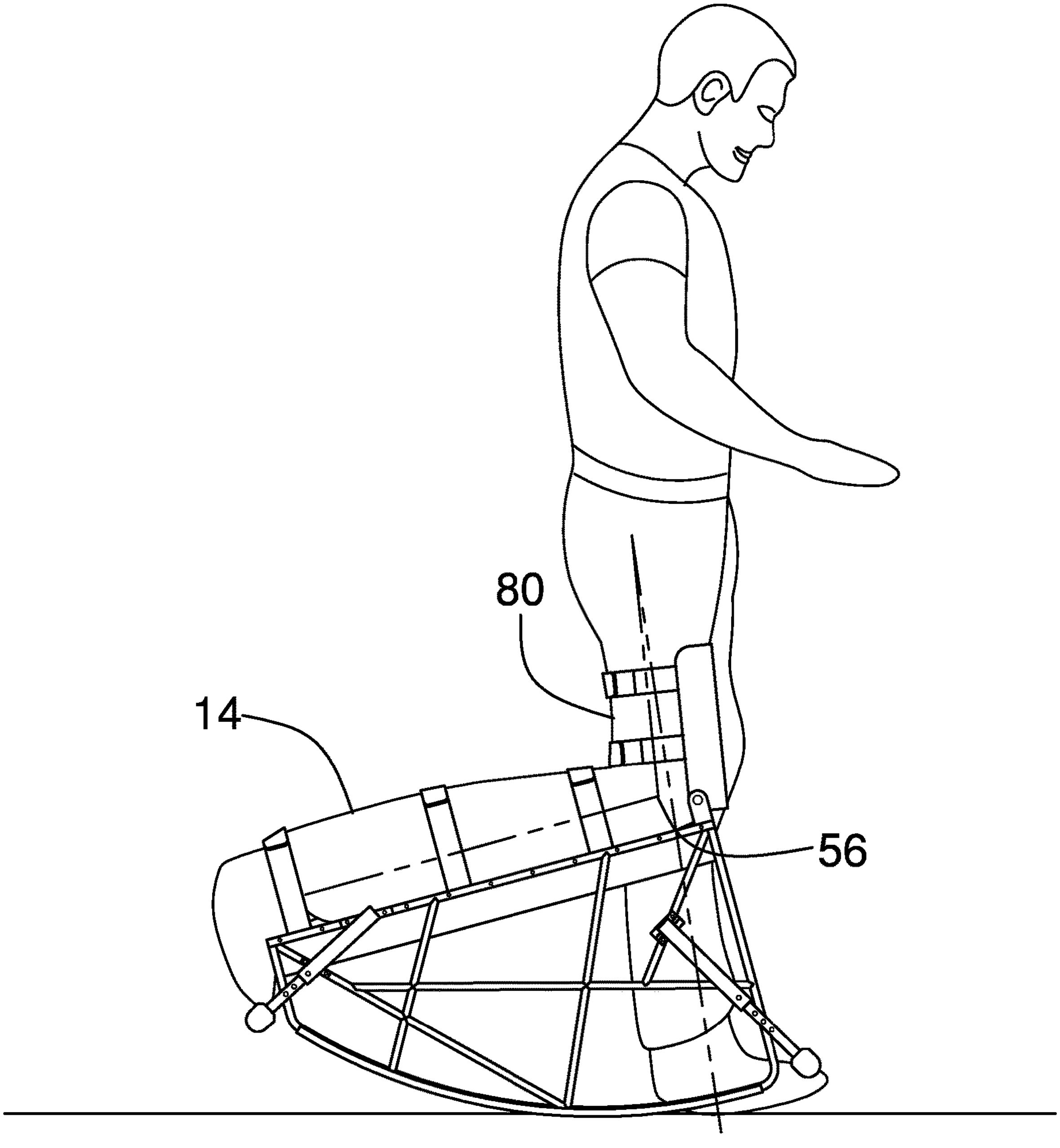
FIG. 7 is a perspective in-use view of an embodiment of the disclosure showing a patient in mid-stride of taking a step.
Figure 8:
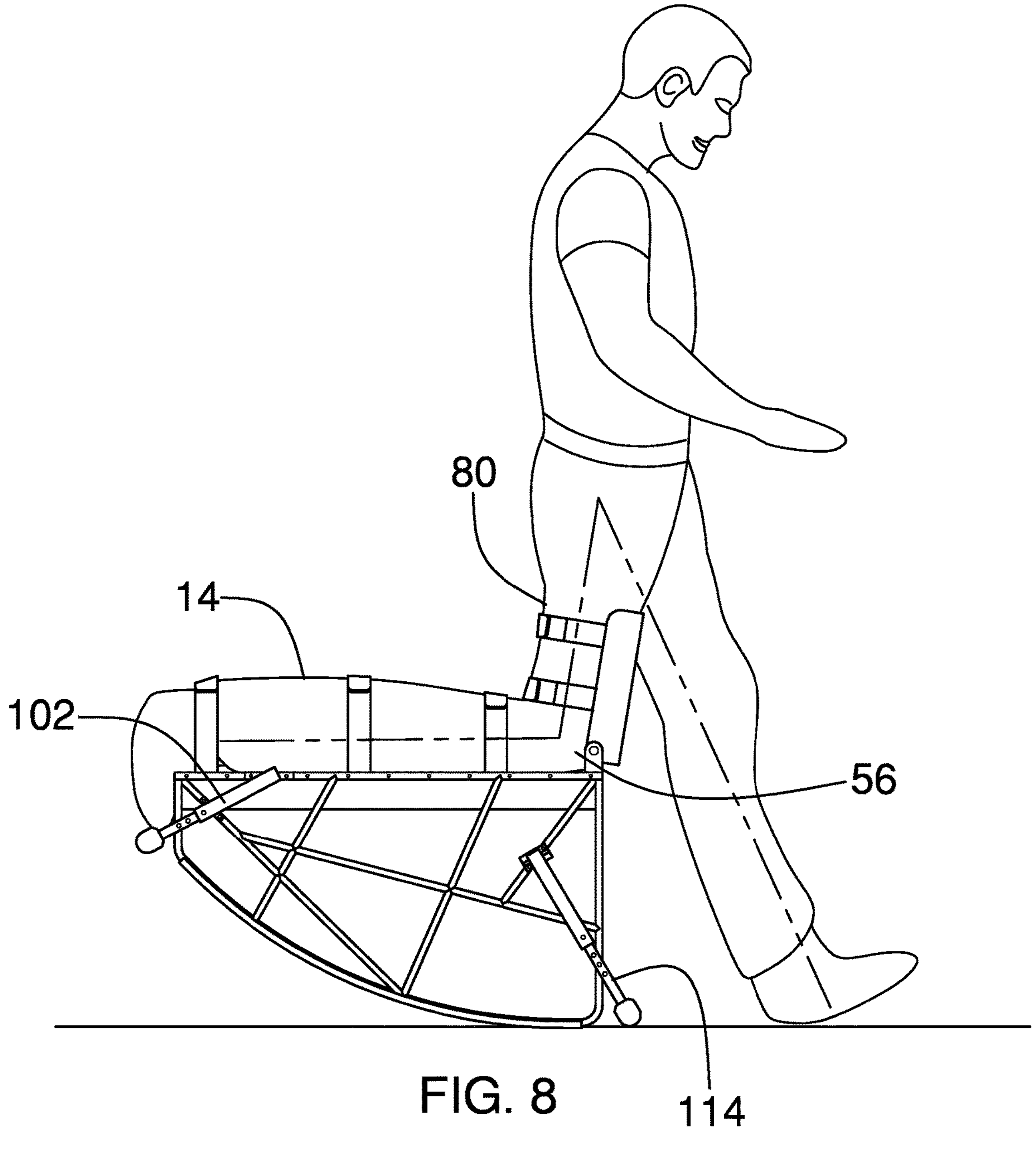
FIG. 8 is a perspective in-use view of an embodiment of the disclosure showing a patient finishing taking a step.

With reference now to the drawings, and in particular to FIGS. 1 through 8 thereof, a new walking device embodying the principles and concepts of an embodiment of the disclosure and generally designated by the reference numeral 10 will be described.

As best illustrated in FIGS. 1 through 8, the walking roller assembly 10 generally comprises a leg sling 12 for receiving a patient's lower leg 14. The leg sling 12 has a front end 16, a back end 18, a first lateral edge 20 and a second lateral edge 22, and the leg sling 12 is elongated between the front end 16 and the back end 18. A plurality of lower leg straps 24 is each coupled to the leg sling 12 and each of the lower leg straps 24 is extendable over the patient's lower leg 14 for securing the leg sling 12 to the patient's lower leg 14. The lower leg straps 24 are spaced apart from each other and are distributed between the front end 16 and the back end 18 of the leg sling 12.

Each of the lower leg straps 24 comprises a first strap 26 extending away from the first lateral edge 20 of the leg sling 12. The first strap 26 has a distal end 28 with respect to the leg sling 12 and a first mating unit 30 is adjustably attached to the distal end 28 of the first strap 26. Each lower leg 14 strap includes a second strap 32 extending away from the second lateral edge 22 of the leg sling 12. The second strap 32 has a distal end 34 with respect to the leg sling 12 and a second mating unit 36 is adjustably attached to the distal end 34 of the second strap 32. The second mating unit 36 is matable to the first mating unit 30 for securing each of the first strap 26 and the second strap 32 around the patient's lower leg 14.

A pair of roller frames 38 is provided and each of the roller frames 38 is attached to the leg sling 12. Each of the roller frames 38 has a curved member 40 which engages a support surface 42 upon which the patient is walking. In this way each of the roller frames 38 inhibits the patient's lower leg 14 from supporting the patient's body weight to facilitate a leg injury to heal. The curved member 40 of each of the roller frames 38 curves downwardly with respect to the leg sling 12 thereby facilitating the leg sling 12 to rock when the patient walks to simulate the patient's normal gait.

The curved member 40 has a first end 44 and a second end 46, and the curved member 40 has a pair of bends 48 defining a first portion 50 of the curved member 40 forming an angle with and extending between each of a second portion 52 of the curved member 40 and a third portion 54 of the curved member 40. The first end 44 is associated with the second portion 52 and the second end 46 is associated with the third portion 54. The first portion 50 curves downwardly between the pair of bends 48, and each of the third portion 54 and the second portion 52 is oriented parallel with each other. Additionally, the second portion 52 has a length that is greater than the length of the third portion 54 such that the first portion 50 curves upwardly between the second portion 52 and the third portion 54. The first portion 50 has a rolling arc extending from the third portion 54 toward the second portion 52 such that the patient's knee 56 travels upwardly as the first portion 50 travels along the rolling arc. In this way each of the roller frames 38 can simulate the patient's normal gait.

Each of the roller frames 38 comprises an upper member 58 that has a front end 60 and a back end 62. The upper member 58 of each of the roller frames 38 is attached to a respective one of the first lateral edge 20 and the second lateral edge 22 of the leg sling 12. Additionally, the upper member 58 of each of the roller frames 38 extends between the front end 16 and the back end 18 of the leg sling 12. The first end 44 of the curved member 40 is attached to the front end 60 of the upper member 58 and the second end 46 of the curved member 40 is attached to the back end 62 of the upper member 58. Each of the roller frames 38 includes a series of vertical members 64 that is each coupled between the upper member 58 and the first portion 50 of the curved member 40.

Each of the roller frames 38 includes an angled member 66 that is coupled between the back end 18 of the upper member 58 and the first portion 50 of the curved member 40. The angled member 66 angles forwardly toward the second portion 52 of the curved member 40. Each of the roller frames 38 includes a horizontal member 68 that is coupled between the angled member 66 and the second portion 52 of the curved member 40. The horizontal member 68 is positioned between the first portion 50 of the curved member 40 and the upper member 58.

A pair of skid pads 70 is provided and each of the skid pads 70 is coupled to the first portion 50 of the curved member 40 of a respective one of the roller frames 38 thereby facilitating each of the skid pads 70 to abut the support surface 42. Each of the skid pads 70 is elongated to extend between the third portion 54 and the second portion 52 of the respective curved member 40. Furthermore, each of the skid pads 70 is comprised of a friction enhancing material thereby inhibiting the first portion 50 of the curved member 40 from sliding on the support surface 42.

A plurality of folding arms 72 is provided and each of the folding arms 72 is pivotally coupled between the pair of roller frames 38. The folding arms 72 are positionable in an unfolded position having the roller frames 38 being spaced apart from each other. The folding arms 72 are positionable in a folded position having the roller frames 38 resting against each other. The plurality of folding arms 72 includes a set of first folding arms 74 and a set of second folding arms 76. Each of the first folding arms 74 is pivotally coupled together at a central pivot point 75 such that the first folding arms 74 forms an X shape. Each of second folding arms 76 is pivotally coupled together at a central pivot point 77 such that the second folding arms 76 forms an X shape. Furthermore, each of the first folding arms 74 is aligned with the front end 16 of the leg sling 12 and each of the second folding arms 76 is aligned with the back end 18 of the leg sling 12.

A leg panel 78 is pivotally attached to the pair of roller frames 38 and the leg panel 78 is oriented at an angle with the leg sling 12. In this way the leg panel 78 can receive the patient's upper leg 80 thereby orienting the patient's leg in a bent position. The leg panel 78 comprises a central portion 82 extending between a pair of outward portions 84, and each of the outward portions 84 is oriented perpendicular to the central portion 82. The central portion 82 is concavely arcuate with respect to the outward portions 84 thereby facilitating the central portion 82 to conform to curvature of the patient's upper leg 80.

A plurality of upper leg straps 86 is each coupled to the leg panel 78 and each of the upper leg straps 86 is extendable over the patient's upper leg 80 for securing the leg panel 78 to the patient's upper leg 80. The plurality of upper leg straps 86 are spaced apart from each other and are distributed along a respective one of the outward portions 84 of the leg panel 78. Each of the upper leg straps 86 comprises a primary strap 88 which extends away from a respective outward portion 84 of the leg panel 78. The primary strap 88 has a distal end 90 with respect to the leg panel 78 and a primary mating unit 91 is adjustably attached to the distal end 90 of the primary strap 88.

Each of the upper leg straps 86 includes a secondary strap 92 extending away from a respective outward portion 84 of the leg panel 78. The secondary strap 92 has a distal end 94 with respect to the leg panel 78 and a secondary mating unit 96 is adjustably attached to the distal end 94 of the secondary strap 92. The secondary mating unit 96 is matable to the primary mating unit 91 for securing each of the primary strap 88 and the secondary strap 92 around the patient's upper leg 80.

A pair of pivots 98 is provided and each of the pivots 98 is coupled to and extends upwardly from the upper member 58 of a respective one of the roller frames 38. Each of the pivots 98 is aligned with the front end 70 of the upper member 58 and each of the outward portions 84 of the leg panel 78 is pivotally coupled to a respective one of the pivots 98. In this way the leg panel 78 can be pivoted toward or away from the back end 18 of the leg sling 12 for accommodating the patient's knee 56 to be positioned at a variety of angles. A knee pad 100 is coupled to a top surface of the leg sling 12 and the knee pad 100 is positioned adjacent to the front end 16 of the leg sling 12 thereby facilitating the knee pad 100 to cushion the patient's knee 56. The knee pad 100 is comprised of a resiliently compressible material thereby facilitating the knee pad 100 to enhance comfort for the patient.

A pair of rear legs 102 is each attached to a respective one of the roller frames 38 and each of the rear legs 102 angles rearwardly from the respective roller frame 38. Moreover, each of the rear legs 102 abuts the support surface 42 when the patient moves their leg to begin taking a step such that the patient's upper leg 80 is positioned at a predetermined angle to begin taking the step. Each of the rear legs 102 has an upper end 104 and a lower end 106, and each of the rear legs 102 comprises a first half 108 which slidably receives a second half 110 such that each of the rear legs 102 has a telescopically adjustable length. The upper end 104 is associated with the first half 108 and the lower end 106 is associated with the second half 110. The first half 108 is attached to the upper member 58 and the angled member 66 of the respective roller frame 38, and the second half 110 extends beyond third portion 54 of the curved member 40 of the respective roller frame 38. A rear foot 112 is attached to the lower end 106 such that the rear foot 112 abuts the support surface 42 when the patient moves their leg to begin taking the step.

A pair of front legs 114 is each movably attached to a respective one of the roller frames 38. Each of the front legs 114 angles forwardly from the respective roller frame 38 such that each of the front legs 114 abuts the support surface 42 when the patient moves their leg to finish taking the step. Each of the front legs 114 has a top end 116 and a bottom end 118, and each of the front legs 114 comprises a primary half 120 which slidably receives a secondary half 122 such that each of the front legs 114 has a telescopically adjustable length. The top end 116 is associated with the primary half 120 and the bottom end 118 is associated with the secondary half 122.

The primary half 120 is hingedly attached to a respective one of the vertical members 64 of the respective roller frame 38 at a point located adjacent to the top end 116 of the front legs 114. Furthermore, the secondary half 122 extends beyond second portion 52 of the curved member 40 of the respective roller frame 38. A front foot 124 is attached to the bottom end 118 such that the front foot 124 abuts the support surface 42 when the patient finishes taking the step. A pair of hinges 126 is each coupled to the vertical member to which the top end 116 of each of the front legs 114 is attached. Additionally, the upper end 104 of each of the front legs 114 is coupled to a respective one of the hinges 126. In this way a respective one of the front legs 114 can be angled outwardly from the respective roller frame 38 depending upon which of the patient's legs the pair of roller frames 38 is disposed.

In use, the patient's lower leg 14 is strapped into the leg sling 12 and the patient's upper leg 80 is strapped into the leg panel 78. Furthermore, the length of each of the rear legs 102 and the front legs 114 is adjusted to accommodate the length of the patient's stride. Thus, the rear legs 102 abut the support surface 42 when the patient steps forward to begin taking a step and the front legs 114 abut the support surface 42 when the patient has completed taking the step. The pair of roller frames 38 rolls along the curved member 40 while the patient is moving through taking the step. In this way the roller frames 38 facilitate the patient to walk while the patient's lower leg 14 is protected from supporting a load. Thus, the patient's lower leg 14 can heal from an injury, for example, while the patient employs the pair of roller frames 38. A respective one of the front legs 114 is positioned to angle away from the respective roller frame 38, depending on which of the patient's legs is being supported, such that the respective front leg 114 angles away from the patient's stride.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A walking roller assembly for inhibiting a patient's lower leg from supporting weight while walking, said assembly comprising:

a leg sling for receiving a patient's lower leg;

a plurality of lower leg straps, each of said lower leg straps being coupled to said leg sling, each of said lower leg straps being extendable over the patient's lower leg for securing said leg sling to the patient's lower leg;

a pair of roller frames, each of said roller frames being attached to said leg sling, each of said roller frames having a curved member which engages a support surface upon which the patient is walking thereby facilitating each of said roller frames to inhibit the patient's lower leg from supporting the patient's body weight wherein each of said roller frames is configured to facilitate a leg injury to heal, said curved member of each of said roller frames curving downwardly with respect to said leg sling thereby facilitating said leg sling to rock when the patient walks wherein each of said roller frames is configured to simulate the patient's normal gait;

a leg panel being pivotally attached to said pair of roller frames, said leg panel being oriented at an angle with said leg sling thereby facilitating said leg panel to receive the patient's upper leg thereby orienting the patient's leg in a bent position; and a plurality of upper leg straps, each of said upper leg straps being coupled to said leg panel, each of said upper leg straps being extendable over the patient's upper leg for securing said leg panel to the patient's upper leg.

2. The assembly according to claim 1, wherein:

said leg sling has a front end, a back end, a first lateral edge and a second lateral edge, said leg sling being elongated between said front end and said back end; and said plurality of lower leg straps is spaced apart from each other and is distributed between said front end and said back end of said leg sling, each of said lower leg straps comprising:

a first strap extending away from said first lateral edge of said leg sling, said first strap having a distal end with respect to said leg sling;

a first mating unit being adjustably attached to said distal end of said first strap;

a second strap extending away from said second lateral edge of said leg sling, said second strap having a distal end with respect to said leg sling; and a second mating unit being adjustably attached to said distal end of said second strap, said second mating unit being matable to said first mating unit for securing each of said first strap and said second strap around the patient's lower leg.

3. The assembly according to claim 1, wherein:

said curved member has a first end and a second end, said curved member having a pair of bends defining a first portion of said curved member forming an angle with and extending between each of a second portion of said curved member and a third portion of said curved member, said first end being associated with said second portion, said second end being associated with said third portion, said first portion curving downwardly between said pair of bends, each of said third portion and said second portion being oriented parallel with each other;

said second portion has a length that is greater than the length of said third portion such that said first portion curves upwardly between said second portion and said third portion; and said first portion has a rolling arc extending from said third portion toward said second portion such that the patient's knee travels upwardly as said first portion travels along said rolling arc wherein each of said roller frames is configured to simulate the patient's normal gait.

4. The assembly according to claim 3, wherein each of said roller frames comprises:

an upper member having a front end and a back end, said upper member of each of said roller frames being attached to a respective one of said first lateral edge and said second lateral edge of said leg sling, said upper member of each of said roller frames extending between said front end and said back end of said leg sling, said first end of said curved member being attached to said front end, said second end of said curved member being attached to said back end;

a series of vertical members, each of said vertical members being coupled between said upper member and said first portion of said curved member;

an angled member being coupled between said back end of said upper member and said first portion of said curved member, said angled member angling forwardly toward said second portion of said curved member; and a horizontal member being coupled between said angled member and said second portion of said curved member, said horizontal member being positioned between said first portion of said curved member and said upper member.

5. The assembly according to claim 3, further comprising a pair of skid pads, each of said skid pads being coupled to said first portion of a respective one of said curved members thereby facilitating each of said skid pads to abut the support surface, each of said skid pads being elongated to extend between said third portion and said second portion of said respective curved member, each of said skid pads being comprised of a friction enhancing material thereby inhibiting said first portion of said curved members from sliding on the support surface.

6. The assembly according to claim 1, further comprising a plurality of folding arms, each of said folding arms being pivotally coupled between said pair of roller frames, said folding arms being positionable in an unfolded position having said roller frames being spaced apart from each other, said folding arms being positionable in a folded position having said roller frames resting against each other, said plurality of folding arms including a set of first folding arms and a set of second folding arms, each of said first folding arms being pivotally coupled together at a central pivot point such that said first folding arms forms an X shape, each of second folding arms being pivotally coupled together at a central pivot point such that said second folding arms forms an X shape, each of said first folding arms being aligned with a front end of said leg sling, each of said second folding arms being aligned with a back end of said leg sling.

7. The assembly according to claim 1, wherein:

said leg panel comprises a central portion extending between a pair of outward portions, each of said outward portions being oriented perpendicular to said central portion, said central portion being concavely arcuate with respect to said outward portions thereby facilitating said central portion to conform to curvature of the patient's upper leg; and said plurality of upper leg straps is spaced apart from each other and is distributed along a respective one of said outward portions of said leg panel, each of said upper leg straps comprising:

a primary strap extending away from a respective outward portion of said leg panel, said primary strap having a distal end with respect to said leg panel;

a primary mating unit being adjustably attached to said distal end of said primary strap;

a secondary strap extending away from a respective outward portion of said leg panel, said secondary strap having a distal end with respect to said leg panel; and a secondary mating unit being adjustably attached to said distal end of said secondary strap, said secondary mating unit being matable to said primary mating unit for securing each of said primary strap and said secondary strap around the patient's upper leg.

8. The assembly according to claim 7, wherein:

each of said roller frames includes an upper member having a front end; and said assembly includes a pair of pivots, each of said pivots being coupled to and extending upwardly from said upper member of a respective one of said roller frames, each of said pivots being aligned with said front end of said upper member, each of said outward portions of said leg panel being pivotally coupled to a respective one of said pivots thereby facilitating said leg panel to be pivoted toward or away from a back end of said leg sling for accommodating the patient's knee to be positioned at a variety of angles.

9. The assembly according to claim 2, further comprising a knee pad being coupled to a top surface of said leg sling, said knee pad being positioned adjacent to said front end of said leg sling thereby facilitating said knee pad to cushion the patient's knee, said knee pad being comprised of a resiliently compressible material thereby facilitating said knee to enhance comfort for the patient.

10. The assembly according to claim 4, further comprising:

a pair of rear legs, each of said rear legs being attached to a respective one of said roller frames, each of said rear legs angling rearwardly from said respective roller frame such that each of said rear legs abuts the support surface when the patient moves their leg to begin taking a step for positioning the patient's upper leg at a predetermined angle to begin taking the step;

each of said rear legs has an upper end and a lower end, each of said rear legs comprising a first half slidably receiving a second half such that each of said rear legs having telescopically adjustable length, said upper end being associated with said first half, said lower end being associated with said second half;

said first half is attached to said upper member and said angled member of said respective roller frame, said second half extending beyond third portion of said curved member of said respective roller frame; and each of said rear legs has a rear foot being attached to said lower end such that said rear foot abuts the support surface when the patient moves their leg to begin taking the step.

11. The assembly according to claim 4, further comprising:

a pair of front legs, each of said front legs being movably attached to a respective one of said roller frames, each of said front legs angling forwardly from said respective roller frame such that each of said front legs abuts the support surface when the patient moves their leg to finish taking the step;

each of said front legs has an top end and a bottom end, each of said front legs comprising a primary half slidably receiving a secondary half such that each of said front legs has telescopically adjustable length, said top end being associated with said primary half, said bottom end being associated with said secondary half;

said primary half is hingedly attached to a respective one of said vertical members of said respective roller frame at a point located adjacent to said top end of said front legs, said secondary half extending beyond second portion of said curved member of said respective roller frame; and each of said front legs has a front foot being attached to bottom end such that said front foot abuts the support surface when the patient finishes taking the step.

12. The assembly according to claim 11, further comprising a pair of hinges, each of said hinges being coupled to said vertical member to which said top end of each of said front legs is attached, said upper end of each of said front legs being coupled to a respective one of said hinges thereby facilitating a respective one of said front legs to be angled outwardly from said respective roller frame depending upon which of the patient's legs said pair of roller frames is disposed.

13. A walking roller assembly for inhibiting a patient's lower leg from supporting weight while walking, said assembly comprising:

a leg sling for receiving a patient's lower leg, said leg sling having a front end, a back end, a first lateral edge and a second lateral edge, said leg sling being elongated between said front end and said back end;

a plurality of lower leg straps, each of said lower leg straps being coupled to said leg sling, each of said lower leg straps being extendable over the patient's lower leg for securing said leg sling to the patient's lower leg, said plurality of lower leg straps being spaced apart from each other and being distributed between said front end and said back end of said leg sling, each of said lower leg straps comprising:

a first strap extending away from said first lateral edge of said leg sling, said first strap having a distal end with respect to said leg sling;

a first mating unit being adjustably attached to said distal end of said first strap;

a second strap extending away from said second lateral edge of said leg sling, said second strap having a distal end with respect to said leg sling; and a second mating unit being adjustably attached to said distal end of said second strap, said second mating unit being matable to said first mating unit for securing each of said first strap and said second strap around the patient's lower leg;

a pair of roller frames, each of said roller frames being attached to said leg sling, each of said roller frames having a curved member which engages a support surface upon which the patient is walking thereby facilitating each of said roller frames to inhibit the patient's lower leg from supporting the patient's body weight wherein each of said roller frames is configured to facilitate a leg injury to heal, said curved member of each of said roller frames curving downwardly with respect to said leg sling thereby facilitating said leg sling to rock when the patient walks wherein each of said roller frames is configured to simulate the patient's normal gait, said curved member having a first end and a second end, said curved member having a pair of bends defining a first portion of said curved member forming an angle with and extending between each of a second portion of said curved member and a third portion of said curved member, said first end being associated with said second portion, said second end being associated with said third portion, said first portion curving downwardly between said pair of bends, each of said third portion and said second portion being oriented parallel with each other, said second portion having a length being greater than the length of said third portion such that said first portion curves upwardly between said second portion and said third portion, said first portion having a rolling arc extending from said third portion toward said second portion such that the patient's knee travels upwardly as said first portion travels along said rolling arc wherein each of said roller frames is configured to simulate the patient's normal gait, each of said roller frames comprising:

an upper member having a front end and a back end, said upper member of each of said roller frames being attached to a respective one of said first lateral edge and said second lateral edge of said leg sling, said upper member of each of said roller frames extending between said front end and said back end of said leg sling, said first end of said curved member being attached to said front end of said upper member, said second end of said curved member being attached to said back end of said upper member;

a series of vertical members, each of said vertical members being coupled between said upper member and said first portion of said curved member;

an angled member being coupled between said back end of said upper member and said first portion of said curved member, said angled member angling forwardly toward said second portion of said curved member; and a horizontal member being coupled between said angled member and said second portion of said curved member, said horizontal member being positioned between said first portion of said curved member and said upper member;

a pair of skid pads, each of said skid pads being coupled to said first portion of said curved member of a respective one of said roller frames thereby facilitating each of said skid pads to abut the support surface, each of said skid pads being elongated to extend between said third portion and said second portion of said respective curved member, each of said skid pads being comprised of a friction enhancing material thereby inhibiting said first portion of said curved member from sliding on the support surface;

a plurality of folding arms, each of said folding arms being pivotally coupled between said pair of roller frames, said folding arms being positionable in an unfolded position having said roller frames being spaced apart from each other, said folding arms being positionable in a folded position having said roller frames resting against each other, said plurality of folding arms including a set of first folding arms and a set of second folding arms, each of said first folding arms being pivotally coupled together at a central pivot point such that said first folding arms forms an X shape, each of second folding arms being pivotally coupled together at a central pivot point such that said second folding arms forms an X shape, each of said first folding arms being aligned with said front end of said leg sling, each of said second folding arms being aligned with said back end of said leg sling;

a leg panel being pivotally attached to said pair of roller frames, said leg panel being oriented at an angle with said leg sling thereby facilitating said leg panel to receive the patient's upper leg thereby orienting the patient's leg in a bent position, said leg panel comprising a central portion extending between a pair of outward portions, each of said outward portions being oriented perpendicular to said central portion, said central portion being concavely arcuate with respect to said outward portions thereby facilitating said central portion to conform to curvature of the patient's upper leg;

a plurality of upper leg straps, each of said upper leg straps being coupled to said leg panel, each of said upper leg straps being extendable over the patient's upper leg for securing said leg panel to the patient's upper leg, said plurality of upper leg straps being spaced apart from each other and being distributed along a respective one of said outward portions of said leg panel, each of said upper leg straps comprising:

a primary strap extending away from a respective outward portion of said leg panel, said primary strap having a distal end with respect to said leg panel;

a primary mating unit being adjustably attached to said distal end of said primary strap;

a secondary strap extending away from a respective outward portion of said leg panel, said secondary strap having a distal end with respect to said leg panel; and a secondary mating unit being adjustably attached to said distal end of said secondary strap, said secondary mating unit being matable to said primary mating unit for securing each of said primary strap and said secondary strap around the patient's upper leg;

a pair of pivots, each of said pivots being coupled to and extending upwardly from said upper member of a respective one of said roller frames, each of said pivots being aligned with said front end of said upper member, each of said outward portions of said leg panel being pivotally coupled to a respective one of said pivots thereby facilitating said leg panel to be pivoted toward or away from said back end of said leg sling for accommodating the patient's knee to be positioned at a variety of angles;

a knee pad being coupled to a top surface of said leg sling, said knee pad being positioned adjacent to said front end of said leg sling thereby facilitating said knee pad to cushion the patient's knee, said knee pad being comprised of a resiliently compressible material thereby facilitating said knee to enhance comfort for the patient;

a pair of rear legs, each of said rear legs being attached to a respective one of said roller frames, each of said rear legs angling rearwardly from said respective roller frame such that each of said rear legs abuts the support surface when the patient moves their leg to begin taking a step for positioning the patient's knee at a predetermined angle to begin taking the step, each of said rear legs having an upper end and a lower end, each of said rear legs comprising a first half slidably receiving a second half such that each of said rear legs having telescopically adjustable length, said upper end being associated with said first half, said lower end being associated with said second half, said first half being attached to said upper member and said angled member of said respective roller frame, said second half extending beyond third portion of said curved member of said respective roller frame, each of said rear legs having a rear foot being attached to said lower end such that said rear foot abuts the support surface when the patient moves their leg to begin taking the step;

a pair of front legs, each of said front legs being movably attached to a respective one of said roller frames, each of said front legs angling forwardly from said respective roller frame such that each of said front legs abuts the support surface when the patient moves their leg to finish taking the step, each of said front legs having an top end and a bottom end, each of said front legs comprising a primary half slidably receiving a secondary half such that each of said front legs has telescopically adjustable length, said top end being associated with said primary half, said bottom end being associated with said secondary half, said primary half being hingedly attached to a respective one of said vertical members of said respective roller frame at a point located adjacent to said top end of said front legs, said secondary half extending beyond second portion of said curved member of said respective roller frame, each of said front legs having a front foot being attached to said bottom end such that said front foot abuts the support surface when the patient finishes taking the step; and a pair of hinges, each of said hinges being coupled to said vertical member to which said top end of each of said front legs is attached, said upper end of each of said front legs being coupled to a respective one of said hinges thereby facilitating a respective one of said front legs to be angled outwardly from said respective roller frame depending upon which of the patient's legs said pair of roller frames is disposed.

* * * * *